US009334827B2

(12) United States Patent
Seelke et al.

(10) Patent No.: US 9,334,827 B2
(45) Date of Patent: May 10, 2016

(54) AGRICULTURAL WORKING MACHINE

(71) Applicant: CLAAS SELBSTFAHRENDE ERNTEMASCHINEN GMBH, Harsewinkel (DE)

(72) Inventors: Carsten Seelke, Brockum (DE); Klaus Ellermann, Lage (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 167 days.

(21) Appl. No.: 14/021,084

(22) Filed: Sep. 9, 2013

(65) Prior Publication Data

US 2014/0081555 A1 Mar. 20, 2014

(30) Foreign Application Priority Data

Sep. 14, 2012 (DE) .......................... 10 2012 018 160

(51) Int. Cl.
*F02D 45/00* (2006.01)
*A01B 63/02* (2006.01)
*A01B 69/00* (2006.01)
*A01B 63/112* (2006.01)

(52) U.S. Cl.
CPC ................ *F02D 45/00* (2013.01); *A01B 63/02* (2013.01); *A01B 63/112* (2013.01); *A01B 69/004* (2013.01)

(58) Field of Classification Search
CPC ...... F02D 45/00; A01B 63/112; A01B 63/02; A01B 69/004
USPC .................................. 701/102, 50, 54, 84, 36
See application file for complete search history.

(56) References Cited

U.S. PATENT DOCUMENTS

| 5,797,110 | A * | 8/1998 | Braun et al. ..................... 701/84 |
| 7,559,259 | B2 | 7/2009 | Fruhwirth et al. |
| 7,727,114 | B2 * | 6/2010 | Tarasinski et al. ............ 477/110 |
| 2008/0053669 | A1 | 3/2008 | Hou et al. |
| 2009/0093937 | A1 * | 4/2009 | Lupo et al. ....................... 701/84 |
| 2009/0127031 | A1 * | 5/2009 | Corder et al. .................. 187/393 |
| 2009/0319136 | A1 * | 12/2009 | Anderson et al. ............... 701/54 |
| 2010/0076662 | A1 * | 3/2010 | Sheidler et al. ............... 701/102 |
| 2011/0010058 | A1 * | 1/2011 | Saito et al. ....................... 701/50 |
| 2011/0288731 | A1 * | 11/2011 | Minto et al. .................... 701/54 |

FOREIGN PATENT DOCUMENTS

| DE | 102006027834 | 12/2007 |
| EP | 0176725 | 4/1986 |
| EP | 1338934 | 8/2003 |

(Continued)

OTHER PUBLICATIONS

Andreas Huber: "Determination of Process-Dependent Load Collectives of a Hydrostatic Travel Drive Train", Karlsruher Schriftenreihe Frahzeug-Systemtechnik, Band 2, 2010.

*Primary Examiner* — Mahmoud Gimie
(74) *Attorney, Agent, or Firm* — Michael J. Striker

(57) ABSTRACT

An agricultural working system includes a self-propelled agricultural working machine equipped with an attachment in the form of a soil-management device such as a plow, a cultivator, or a harrow, a drive unit that acts as a drive train on land wheels, a control arrangement and a user interface and display unit associated with the control arrangement (5). The control arrangement ascertains the torque loads that occur during the working operation for at least one drive-train component, for example, drive shafts of the land wheels and provides at least one control function on the basis of the ascertained torque loads.

19 Claims, 2 Drawing Sheets

(56) References Cited

FOREIGN PATENT DOCUMENTS

| EP | 1714822 | 10/2006 |
|---|---|---|
| GB | 1366179 | 9/1974 |
| RU | 2023359 | 11/1994 |
| SU | 1429960 | 10/1988 |

* cited by examiner

AGRICULTURAL WORKING MACHINE

CROSS-REFERENCE TO A RELATED APPLICATION

The invention described and claimed hereinbelow is also described in German Priority Document DE 10 2012 018160.4, filed on Sep. 14, 2012. The German Priority Document, the subject matter of which is incorporated herein by reference, provides the basis for a claim of priority of invention under 35 U.S.C. 119(a)-(d).

BACKGROUND OF THE INVENTION

The invention relates to an agricultural working system comprising a self-propelled agricultural working machine that can be equipped with at least one attachment, in particular a soil-management device such as a plow, a cultivator, or a harrow, and to a control arrangement for such a working system.

The working machines are, for example, tractors, high-loaders (in particular telescopic loading devices), as well as self-propelled harvesting machines or the like.

Like working systems are known. For example, EP 1 338 934 A1 discloses a tractor that can be equipped with various attachments and including a microprocessor-based control arrangement provided for the control of all drive-relevant components, e.g., a drive unit comprising the drive motor, a transmission, a braking system or the like. A user interface and display unit is associated with the control arrangement to enable the input and output of operating information.

In contrast to passenger cars and trucks, the structural design of the agricultural working machine poses a special challenge in terms of a required service life. This is due to the large number of possible attachments, which result in extremely diverse load situations in the drive train of the working machine. Even when there is only one attachment, the load situation can fluctuate to an extraordinary extent depending on the particular basic conditions. One example thereof is an attachment designed as a plow, which can cause entirely different load situations depending on the ground condition.

In addition, the user typically performs ballasting of the agricultural working machine under discussion. If the ballasting is faulty, unnecessarily high torque loads can occur, particularly at the drive shafts of the land wheels thereby affecting the expected service life.

Also, it must be taken into account that the working machine is often equipped with a transmission having a continuously variable speed reduction (a continuously variable transmission, CVT). As such, the drive motor of the working machine can be located at a constant operating point having a predetermined, preferably maximum power output. At low speeds, this can result in correspondingly high torque loads at the drive shafts of the land wheels.

In order to ensure the nominal service life of the working machine in the present sense, it is necessary to remain within the load collective on the basis of which the working machine was designed. If this design-based load collective is exceeded, the service life may be reduced, provided that this exceeding of the load collective is not compensated by a corresponding underweight.

In light of the aforementioned variability and, not least, in light of the numerous possible operating errors (which can also result in increased loads), remaining within the aforementioned design-based load collective poses a challenge with respect to the known working system.

SUMMARY OF THE INVENTION

The present invention overcomes the shortcomings of known arts, such as those mentioned above.

To that end, the invention provides an agricultural working system configured so that a load-induced reduction in service life is prevented.

An essential aspect of the invention is the consideration that the control arrangement ascertains the torque loads that occur during the working operation for at least one drive-train component (preferably for the drive shafts of the land wheels) and, provides at least one control function on the basis of the ascertained torque loads.

In an embodiment, the control function is used to eliminate and/or prevent a destructive or service-life reducing load on drive-train components such as the aforementioned drive shafts of the land wheels.

The consideration to check individual drive-train components of an agricultural working machine for the local torque loads makes it possible to influence the load situation of the working machine in a targeted manner using control technology and to adapt the design accordingly in order to deliberately remain within the nominal service life of the working machine.

Basically, the control arrangement is designed purely as machine control and is disposed in the working machine. However, at least a portion of the control arrangement is preferably designed as telemetry-based control, which communicates with a control part on the machine via a wireless connection, or the like.

In another embodiment, the torque load is determined on the basis of the torque-induced torsional flexing of the particular drive-train component. The rotation sensors of an antilock braking system of the working machine, which are present anyway, are used in this case.

In order to obtain an absolute value for the particular torque load, the first step is to perform a calibration measurement under a known torque load, preferably a torque load that approaches zero. The measurement of the torque value is then performed relative to this calibration measurement thereby resulting in an absolute value for the torque load. Determining torque load is found in DE 10 2006 027 834 A1.

Application of the known measurement principle on self-propelled agricultural working machines makes it possible, for the first time, to deliberately meet service-life requirements by means of simple control-technology measures.

Drive-train components are largely prevented from breaking due to an excess torque load by invention. For example, in an embodiment of the control arrangement, an appropriate control-technological countermeasure is implemented already as the ascertained torque load approaches the particular breaking load.

In another embodiment, the actual load collective is compared to the design-based load collective, on the basis of which the working machine was designed. Depending on the result of this comparison, the control arrangement implements appropriate control-technological measures. This makes it possible to reach the nominal service life of the working machine "on the dot", thereby ensuring an optimal working operation without the working machine failing before expiration of the nominal service life.

In another embodiment, the invention relates to a series of operating situations, which can be ascertained or halted by means of control technology on the basis of the torque loads that are ascertained. The double use of the ascertained torque loads, namely to ensure the nominal service life and to optimize the operating situations, results in a particularly cost-effective overall solution in the present case.

In another embodiment, a control arrangement of an above-described working system is designed purely as machine control or in part as a telemetry-based control.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
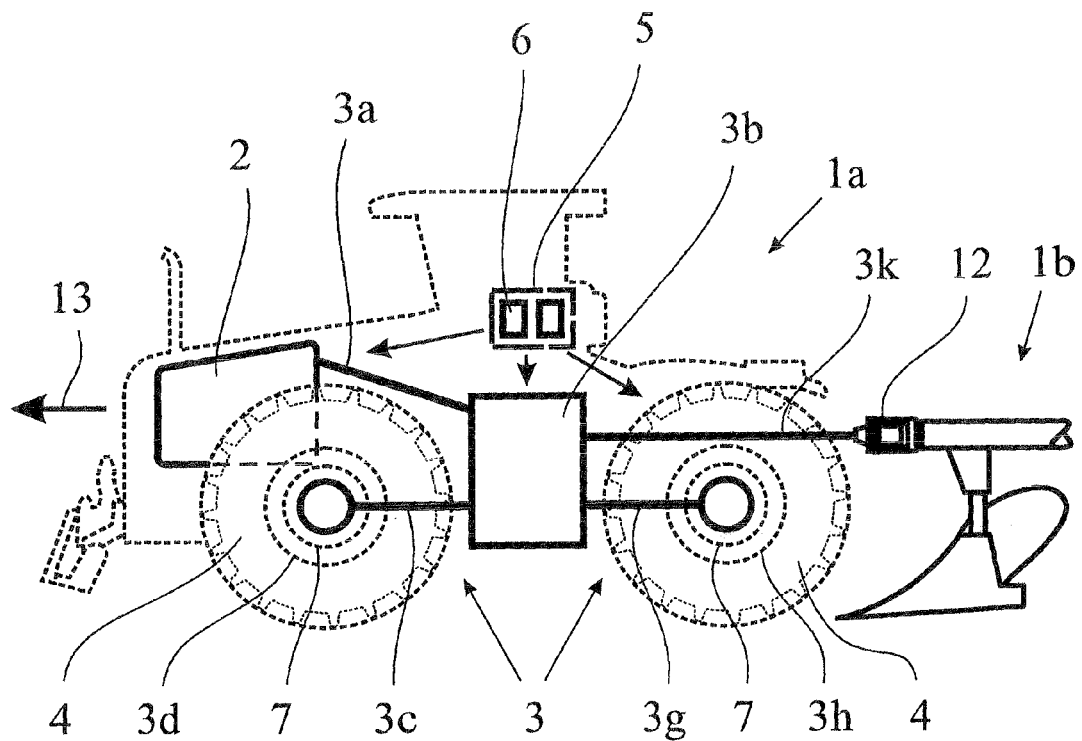
FIG. 1 is a schematic representation of an agricultural working system comprising an agricultural working machine and attachment configured according to the invention, in a side view.

Numerous variants for the embodiment of the depicted working machine 1a of the proposed agricultural working system are feasible. As mentioned, the working machine 1a (FIG. 1) can be, for example, a tractor, a high-loader (in particular a telescopic loading device), as well as a self-propelled harvesting machine, or the like.

The working machine 1a is equipped with a large number of attachments 1b. The attachment 1b also can be a soil-management device such as a plow (FIG. 1), a cultivator, or a harrow. Other attachments 1, such as haymaking machines, sowing machines, or the like, are feasible.

The working machine 1a is equipped with a drive unit 2, which in this case is a diesel engine. The drive unit 2 acts on the land wheels 4 in the usual manner via a drive train 3.

The working machine 1a is an all-wheel drive working machine 1a, and therefore all four land wheels 4 are driven or driveable. The land wheels 4 have the same nominal diameter. Basically, however, the land wheels 4 also can have different nominal diameters.

Specifically, the drive unit 2 is coupled via the drive shaft 3a to a continuous transmission 3b, which transfers the drive power via the drive shaft 3c and the differential 3d to the two drive shafts 3e and 3f of the front land wheels 4 and via the drive shaft 3g via the differential 3h to the drive shafts 3i and 3j of the rear land wheels 4. Furthermore, a P.T.O. shaft 3k is provided that extends from the transmission 3b for use in driving the particular attachment 1b.

A control arrangement 5 and a user interface and display unit 6, which is associated with the control arrangement 5, are provided for the actuation of the drive-relevant components. The drive-relevant components to be actuated are the aforementioned drive unit 2, the transmission 3b, the two differentials 3d, 3h, and other drive-relevant components such as the braking system 1, or the like.

The control arrangement 5 ascertains the torque loads that occur during the working operation for at least one drive-train component 3a-k, in this case and preferably for the drive shafts 3e, f, i, j of the land wheels 4 and, on the basis of the ascertained torque loads, provides at least one control function. The control function is a control function for eliminating and/or preventing a destructive or service-life reducing load on drive-train components.

The control arrangement 5 is purely machine control, which is accommodated in entirety in the working machine 1a. However, at least a portion of the control arrangement 5 also can be embodied as telemetry-based control and disposed separately from the working machine 1a. The telemetry-based control can be disposed, for example, remotely of the working machine 1a in a management building of the machine operator or the machine manufacturer, and can communicate with the machine-side part of the control arrangement 5 via a wireless connection, a UMTS connection, or the like.

The determination of the torque loads is continuous during the entire working operation of the working machine 1a. This ensures that any torque load that is an excess load on the drive train 3 is responded to. However, it also is feasible for the determination of the torque loads to take place at specified time intervals or to be triggered by a predetermined event, for example, an operation-related event.

In the embodiment shown, only the drive shafts 3e, f, i, j of the land wheels 4 are monitored in terms of the torque loads thereof. It also is possible for the P.T.O. shaft 3k or the drive shafts 3a, 3c and 3g to be monitored in a corresponding manner.

Preferably, the determination of the torque load related to a drive-train component 3e, f, i, j is ascertained based on the torque-induced torsional flexing of the particular drive-train component 3e, f, i, j. In this case, the torque-induced torsional flexing is ascertained using rotation sensors 8a, 8b, which are disposed at a distance from one another along the drive-train component 3e, f, i, j. The rotation sensors 8a, 8b can be rotational angle sensors or speed sensors, wherein, in the latter case, a measure is taken to ascertain an angular difference between the two angular rotation sensors. The measure is preferably a time measurement.

Figure 2:
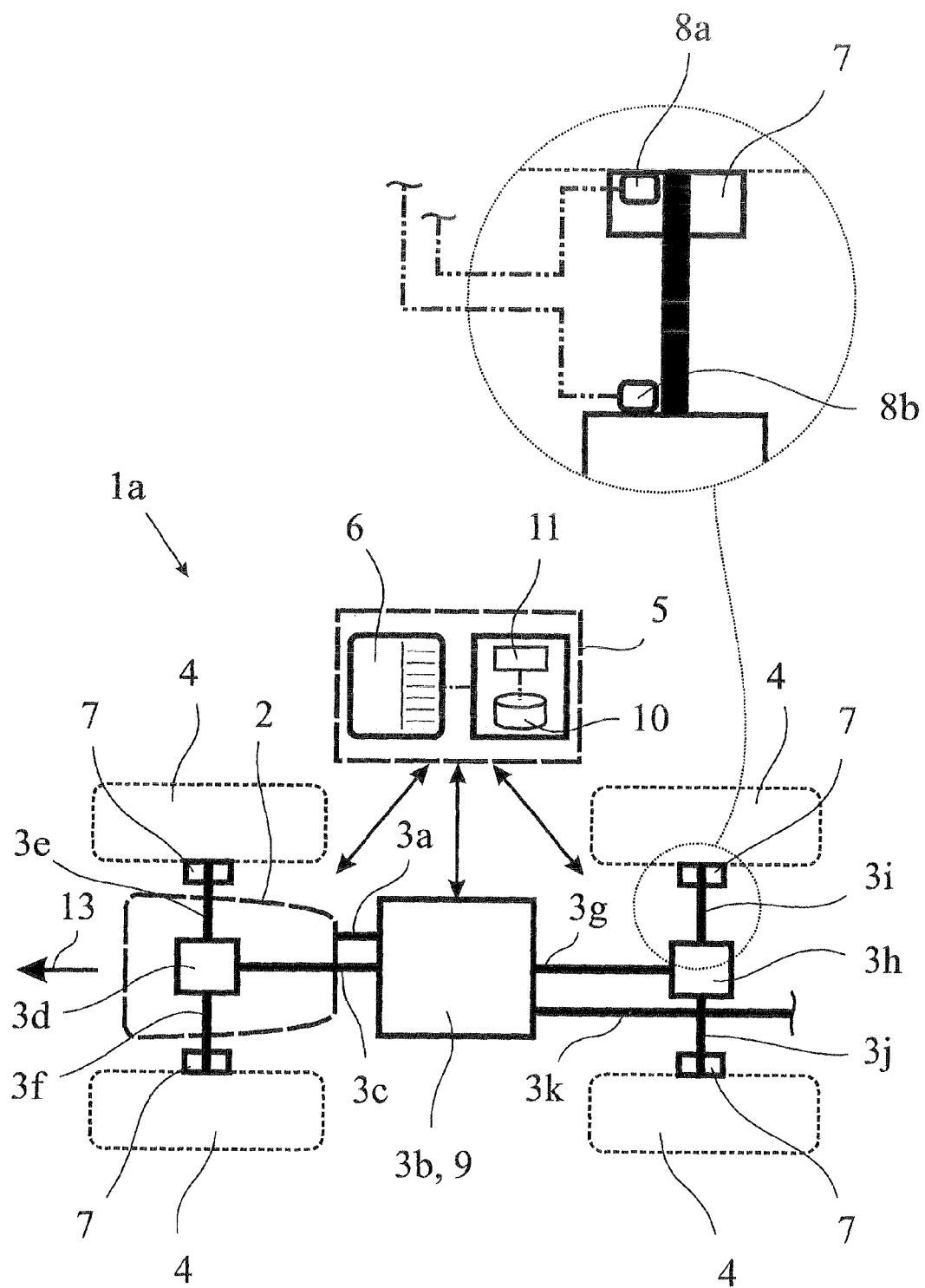
FIG. 2 is a top view of the working machine of FIG. 1.

In FIG. 2, the sensor 8a is a rotation sensor of an antilock braking system, which results in a cost-effective design. It should be pointed out that the sensors 8a, 8b provided for ascertaining the torque load are shown in FIG. 2 only for the land wheel 4 depicted therein in the upper-right hand corner. As shown, all drive shafts 3e, f, i, j of the land wheels 4 are each equipped with a pair of such rotation sensors.

A drive configuration is associated with the working machine 1a in the working operation. The drive configuration comprises all machine-specific, control-technological, and mechanical parameters that influence the torque loads in the drive train 3 during the working operation. The drive configuration therefore comprises, for example, the actuation of the drive unit 2 in terms of the power settings thereof, the transmission actuation, the ballasting, etc.

On the basis of the ascertained torque loads, the control arrangement 5 determines an evaluation and/or optimization of the drive configuration in terms of the various objectives, such as low likelihood of breakage, nominal service life, and/or high device output. It also is preferable for the control arrangement 5 to inform the operator about the evaluation and/or optimization in terms of at least one objective.

Alternatively, or additionally, the control arrangement 5 performs the ascertained optimization of the drive configuration by means of an appropriate actuation of components of the motor, in particular, provides related automated functions such as automatic ballasting, or the like, are available.

The determination of the aforementioned evaluation and/or optimization also is carried out depending on the type of attachment 1b being used. For example, the relevant parameters of known attachments 1b can be stored in a data memory of the control arrangement 5 for this purpose.

The drive train 3 shown comprises a transmission 3b, as mentioned above, which, at least in one sub-drive train, is designed as a continuous variable transmission (CVT) transmission 9. The speed reduction of the CVT transmission 9 is steplessly adjusted by the control arrangement 5. In one operating mode, the control arrangement 5 sets the drive unit 2 to a constant power output, which is preferably the maximum power output. It is thereby ensured that the drive unit 2 always functions in the optimal operating point. The change in ground speed therefore results from a variable setting of the speed reduction of the CVT transmission 9, which is usually dependent on the operating requirements such as the actuation of an accelerator pedal by the operator.

The control arrangement 5 is shown in the drawing figures as the central control arrangement 5, comprising a data memory 10 and a microprocessor 11. However, the control arrangement 5 can be at least partially decentrally distributed, as mentioned above. To this extent, the depiction in the figures is intended to merely represent a control structure.

In order to prevent breakage of a drive shaft 3e, f, i, j, for example, the control arrangement 5 ascertains that the load situation is approaching a breakage situation. The particular breaking loads are stored in a data memory 10 of the control arrangement 5 for various drive-train components 3e, f, i, j, wherein the control arrangement 5 compares the torque loads (determined according to the invention), with the particular breaking loads and, on the basis of the comparison, determines an evaluation and/or optimization of the drive configuration in terms of the target parameter of a low likelihood of breakage.

In the simplest case, it is feasible here to reduce the power output of the drive unit 2. Another possibility is to vary the torque distribution between the shafts 3c and 3g by means of a corresponding actuation of the transmission 3b. However, it also is feasible to continue utilizing a simple operator notification, in order to permit the operator to implement the necessary measures himself.

In an embodiment, in which the focus is on remaining within a nominal service life of the working machine 1a, a design-based load collective is stored in a data memory 10 of the control arrangement 5. The design-based load collective is the load collective used as the basis for the design of the working machine 1a in terms of the nominal service life. The determination of such a load collective is described, for example, in the publication *Determination of Process-Dependent Load Collectives of a Hydrostatic Travel Drive Train*, Andreas Huber, Karlsruher Schriftenreihe Fahrzeugsystemtechnik, Band 2, 2010, ISBN 978-3-86644-564-2".

The control arrangement 5 determines, on the basis of the torque load ascertained according to the invention, an actual load collective for the drive train 3, namely for the drive-train components 3e, f, i, j in this case. The control arrangement 5 preferably continuously compares the actual load collective with the design-based load collective. On the basis of the comparison, the control arrangement 5 determines an evaluation and/or optimization in terms of the objective of a nominal service life.

In an embodiment, the control arrangement 5 implements the ascertained optimization and, on the basis of the comparison, actuates the drive-relevant components for the applicable change of the drive configuration. Alternatively or additionally, the control arrangement also provides for an operator notification regarding the result of the comparison to be output.

In terms of checking warranty claims, the invention provides that the actual load collective is permanently stored in a data memory 10 of the control arrangement 5 at least in sections, for example, while the design-based load collective is being exceeded by the actual load collective. Proceeding from this background, if the design-based load collective is exceeded by the actual load collective, the control arrangement 5 requires acknowledgement by the operator before permitting operation to continue. Such an acknowledgement is preferably also permanently stored in a data memory 10.

Provided the actual load collective is always less than the design-based load collective ensures that the nominal service life, which is based on the design-based load collective after all, will be met. However, if the actual load collective is greater than the design-based load collective, the expected service life is reduced, and so appropriate countermeasures must be taken. One possible countermeasure is to reduce the power output of the drive unit 2. Another possibility would be to optimize the ballasting of the drive machine 1a.

As mentioned above, the drive configuration comprises the ballasting of the working machine 1a allowing the weight bad on the land wheels 4 to be varied by means of additional weights. Accordingly, the aforementioned optimization of the drive configuration preferably also relates to the ballasting.

Basically, it is feasible for the control arrangement 5 to ascertain a change in the ballasting on the basis of the ascertained torque loads in order to eliminate and/or prevent a destructive or service-life reducing load on drive-train components 3e, f, i, j. For example, the ballasting is faulty when a particularly high load is present at the front land wheels 4, while the rear land wheels 4 have a particularly low load (and may even be slipping). In such a case, the front ballasting must be reduced and the rear ballasting must be increased. The control arrangement 5 carries out the ascertained change of the ballasting via an automatic ballasting system, which is preferably a motor-based ballasting system. Alternatively or additionally, however, the control arrangement 5 can output an operator notification regarding the change in the ballasting, in which case the operator can change the ballasting manually.

In an embodiment for the optimization of the torque distribution, the level of the traction point 12 between the working machine 1a and the attachment 1b is optimized, provided this traction point 12 is height-adjustable. Therefore, the level of the traction point must also be considered in the drive configuration and is affected by the aforementioned optimization. Adjusting the height of the traction point makes it possible to control the torque distribution between the front and rear axles without negatively affecting the working operation.

According to the invention, the control arrangement 5 ascertains, on the basis of the torque loads determined, a change in the level of the traction point 12 in order to eliminate and/or prevent a destructive and/or service-life reducing load of drive train components 3e, f, i, j. The level of the traction point 12 is changed using a motor, controlled by the control arrangement 5. In this case, the control arrangement 5 outputs an operator notification regarding the ascertained change in the level of the traction point 12, on the basis of which the operator can manually adjust the level of the traction point.

Also, it is possible to distribute the load by changing the tire pressures of the land wheels 4, which also must be considered in the drive configuration and which also is optimized accordingly in the above-described sense. Preferably, the control arrangement 5 ascertains, on the basis of the torque loads determined according to the invention, a change in the tire pressures. This results in a predetermined load distribution for the drive shafts 3e, f, i, j, wherein the control arrangement 5 outputs an operator notification regarding the ascertained change in tire pressures. Alternatively or additionally, the control arrangement 5 changes the tire pressures using a tire-control system having a compressor, or the like.

The reader should note, however, that application of the torque loads determined according to the invention is not limited to preventing the destruction of drive components or remaining within the nominal service life of the working machine 1a.

Rather, the torque loads determined according to the invention can be used to ascertain predetermined operating situations, the parameters of which are stored in a data memory 10 of the control arrangement 5. These operating situations are typically hazardous operating situations. Preferably, the control arrangement 5 outputs an operator notification regarding the determination of an operating situation and/or the control arrangement 5 counteracts the operating situation by changing the drive configuration.

One operating situation is, for example, the so-called "tilting situation", in which the working machine 1a is tilted to one side relative to the machine longitudinal axis 13 thereof. This tilting situation is expressed as a torque load on the drive shafts 3e, f, i, j, which is present on one side relative to the machine longitudinal axis 13. The control arrangement 5 also outputs an operator notification regarding the tilting operation. Alternatively or additionally, the control arrangement 5 can engage in the steering or the like, in order to reduce the risk of overturning.

Another operating situation is referred to as "power hopping". This is detected by the control arrangement 5 as a rising, cyclic torque load having a predetermined amplitude at the drive shafts 3e, f, i, j of the land wheels 4. On the basis of the detection, measures are implemented to counteract this operating situation. The measures involve control technology and, in this case are anticyclical in nature. This can be an anticyclical change in the power output of the drive unit 2 or a corresponding anticyclical braking by means of the brake system 7. Alternatively, the control arrangement 5 changes the level of the traction point between the working machine and the attachment 1b in order to eliminate this state.

The "overrun" operating situation is of particular significance for travel along an incline. In this case, the gravity-induced push can cause negative slip to occur without this being noticed by the operator. This operating situation is easily detected by use of the torque load according to the invention, and can be communicated to the operator via an appropriate operator notification.

Another operating situation is referred to as a "clogged situation", in which case a plow or the like has become clogged with dirt. The increasing torque load associated therewith (which moves within a predetermined scope, and which is stored in a data storage unit 10 of the control arrangement 5), is detected accordingly by the control arrangement 5 as a "clogged situation". A relevant operator notification is preferably output via the user interface and display unit 6. Alternatively or additionally, the control arrangement 5 changes the working depth of the attachment 1b, namely the plow or the like, in order to eliminate this state.

A particularly advantageous application of the torque loads of the drive shafts 3e, f, i, j of the land wheels 4 becomes apparent when the working machine 1a is operated with at least one trailer. This relates primarily to preventing the train from buckling when the at least one trailer pushes on the working machine 1a during travel along an incline. The pushing operation is detected by the control arrangement 5 in the manner described above. On the basis of this detection, the control arrangement 5 actuates an appropriate braking of the at least one trailer in order to prevent the train from buckling.

However, the torque loads determined according to the invention also can be utilized to check the power output of the drive unit 2. Preferably, setpoint performance data for the drive unit 2 are stored in a data memory 10 of the control arrangement 3, wherein the actual power output of the drive unit 2 is determined on the basis of the ascertained torque load and is compared with the setpoint performance data. As a result, the control arrangement 5 outputs an operator notification regarding the particular deviation. Alternatively or additionally, an amount the particular deviation is stored. Deviations in the downward direction as well as in the upward direction are interesting, wherein the latter are evidence of power-increasing measures implemented by the user. Such power-increasing measures usually limit warranty claims, which is why the aforementioned storage of the ascertained deviation is of interest.

The determination of the torque loads according to the invention makes it possible to regulate the torque distribution between the individual drive shafts 3e, f, i, j. Therefore, setpoint torque can be distributed among the individual drive shafts 3e, f, i, j in a particularly easy manner. Preferably, the setpoint torque distribution to be set is specified by the operator using the user interface and display unit 6.

The torque loads determined according to the invention also are applied to the braking operation. Preferably, the control arrangement 5 controls the drive-relevant components such that the drive shafts 3e, f, i, j of the land wheels 4 do not have torque load or a braking torque load. This ensures that the drive unit 2 does not function counter to the braking system 7.

Preferably, the working machine 1a is equipped with at least one differential lock 3d, 3h, which can be switched by the control arrangement 5. That is the control arrangement 5 locks and/or releases the differential lock 3d, 3h exclusively in a state in which the torque load (ascertained according to the invention) at both of the sub-drive trains 3e, f, i, j associated with the differential lock 3d, 3h permits the locking or release due to the design. This is preferably the case when the torque loads at both of the sub-drive trains 3e, f, i, j associated with the differential lock 3d, 3h are substantially identical. The operator is thereby relieved of the duty to manually find the correct point in time for locking or releasing the differential lock 3d, 3h.

The control arrangement 5 also includes an operating time counter function for the drive train 3 or for individual drive-train components. Preferably, the ascertained torque load is stored along with the operating time. In an embodiment, the speed at which the operating time is counted is specified by the control arrangement 5 in a load-dependent manner. Different variants are feasible. The operating time is deliberately weighted in a load-dependent manner, resulting in a particularly realistic evaluation of the operating time.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural working system comprising a self-propelled agricultural working machine (1a), the self-propelled agricultural working machine (1a) comprising:
   at least one attachment (1b);
   a drive unit (2) which acts via a drive train (3) on land wheels (4);
   a control arrangement (5); and
   a user interface and display unit (6) associated with the control arrangement (5);
   wherein the control arrangement (5) ascertains torque loads that occur during the working operation for at least one drive-train component (3a-k) of the land wheels (4) and provides at least one control function on the basis of the ascertained torque loads,
   wherein a drive configuration associated with the working machine (1a) in the working operation influences the torque loads in the drive train (3) via the drive configuration, and
   wherein the associated breaking loads are stored in a data memory (10) of the control arrangement (5) for at least one drive-train component (3a-k),
   wherein the control arrangement (5) compares the ascertained torque loads with the particular breaking loads and, on the basis of the comparison, determines an evaluation, optimization or both of the drive configuration in terms of the objective of a low likelihood of breakage, and
   wherein the control arrangement (5) determines, on the basis of the ascertained torque loads, an evaluation, optimization or both, of the drive configuration, or, outputs an operator notification regarding the evaluation, optimization or both, in terms of at least one objective, performs the ascertained optimization of the drive configuration or both.

2. The working system according to claim 1, wherein at least a portion of the control arrangement (5) is a machine control disposed in the working machine (1a).

3. The working system according to claim 1, wherein the control arrangement (5) ascertains, on the basis of the torque-induced torsional flexing of the at least one drive-train component (3a-k), the torque load related to this drive-train component (3a-k).

4. The working system according to claim 1,
   wherein a design-based load collective, to which a nominal service life of the drive train (3) corresponds, is stored in a data memory (10) of the control arrangement (5),
   wherein the control arrangement (5) determines, on the basis of the ascertained torque load, an actual load collective for the drive train (3),
   wherein the control arrangement (5) compares the actual load collective with the design-based load collective and, on the basis of the comparison, determines an evaluation, optimization or both of the drive configuration in terms of the objective of a nominal service life,
   wherein the drive configuration comprises the ballasting of the drive machine (1a),
   wherein the evaluation, optimization or both relate to the ballasting,
   wherein the drive configuration comprises the level of the traction point between the working machine and the attachment (1b),
   wherein the evaluation, optimization or both relates to the level of the traction point,
   wherein the drive configuration comprises the tire pressures of the tires (4), and
   wherein the evaluation and/or optimization relates to the tire pressures of the tires (4).

5. The working system according to claim 1,
   wherein parameters of predetermined operating situations are stored in a data memory (10) of the control arrangement (5), and
   wherein the control arrangement (5) outputs an operator notification regarding the determination of an operating situation, counteracts the operating situation by changing the drive configuration or both.

6. The working system according to claim 5, wherein the control arrangement (5) detects any of the group consisting of:
   a torque load of the drive shafts (3e, f, i, j) of the land wheels (4) that is one-sided relative to the machine longitudinal axis (13) as the "tilting situation" operating situation, and wherein the control arrangement (5) detects a rising, cyclic torque load having a predetermined amplitude at the drive shafts (3e, f, i, j) of the land wheels (4) as the "power hopping" operating situation,
   an occurrence of an overrun load via the ascertained torque load at the drive shafts (3e, f, i, j) of the land wheels (4) as the "override" operating situation,
   an increasing torque load within a predetermined scope as the "clogged situation" operating situation of the attachment (1b), and
   a combination.

7. The working system according to claim 1,
   wherein in the event that at least one trailer is used in the working operation, the control arrangement (5) actuates appropriate braking of the at least one trailer if there is a change in the ascertained torque load of the drive shafts (3e, f, i, j) of the land wheels (4) from a tensile load to a thrust load, in order to prevent the train from buckling.

8. The working system according to claim 1,
   wherein setpoint performance data for the drive unit (2) are stored in a data memory (10) of the control arrangement (5),
   wherein an actual power output of the drive unit (2) is determined on the basis of the ascertained torque load and is compared with the setpoint performance data, and
   wherein the control arrangement (5) outputs an operator notification regarding the particular deviation and/or stores the ascertained deviation.

9. The working system according to claim 1,
   wherein a setpoint torque distribution to individual drive shafts (3a-k) is stored in a data memory (10) of the control arrangement (5), and
   wherein the control arrangement (5) changes the drive configuration on the basis of the ascertained torque load in order to achieve the torque distribution by actuating an operating brake, a controllable transmission, or the like.

10. The working system according to claim 1, wherein the control arrangement (5) changes the drive configuration during braking operation on the basis of the ascertained torque load such that neither a torque load nor a braking torque load occurs at the drive shafts (3e, f, i, j) of the land wheels (4).

11. The working system according to claim 1, further comprising at least one differential lock (3d, 3h) that is switched by the control arrangement (5), and
   wherein the control arrangement (5) locks, releases or locks and releases the differential lock (3d, 3h) exclusively in a state in which the ascertained torque loads at the two sub-drive trains associated with the differential lock permit this.

12. The working system according to claim 1, wherein the control arrangement (5) provides an operating time counter function for the drive train (3), for individual drive-train components (3a-k) or both and stores, in addition to the operating time, the torque load that is ascertained.

13. The agricultural working system of claim 1, wherein the at least one attachment (1b) is a soil-management device selected from the group consisting of a plow, a cultivator and a harrow.

14. The agricultural working system of claim 1, wherein the control arrangement (5) ascertains torque loads that occur during the working operation for drive shafts (3e, f, i, j) of the land wheels (4).

15. The agricultural working system of claim 1, wherein at least a portion of the control arrangement (5) is embodied as telemetry-based control.

16. The working system according to claim 1, wherein the torque-induced torsional flexing is determined by using at least one rotation sensor (8a) of an antilock braking system.

17. An agricultural working system comprising a self-propelled agricultural working machine (1a), the self-propelled agricultural working machine (1a) comprising:
at least one attachment (1b);
a drive unit (2) which acts via a drive train (3) on land wheels (4);
a control arrangement (5); and
a user interface and display unit (6) associated with the control arrangement (5);
wherein the control arrangement (5) ascertains torque loads that occur during the working operation for at least one drive-train component (3a-k) of the land wheels (4) and provides at least one control function on the basis of the ascertained torque loads,
wherein a drive configuration associated with the working machine (1a) in the working operation influences the torque loads in the drive train (3) via the drive configuration,
wherein the associated breaking loads are stored in a data memory (10) of the control arrangement (5) for at least one drive-train component (3a-k),
wherein the control arrangement (5) compares the ascertained torque loads with the particular breaking loads and, on the basis of the comparison, determines an evaluation, optimization or both of the drive configuration in terms of the objective of a low likelihood of breakage, and
wherein the control arrangement (5) determines, on the basis of the ascertained torque loads, an evaluation, optimization or both, of the drive configuration, or, outputs an operator notification regarding the evaluation, optimization or both, in terms of at least one objective, performs the ascertained optimization of the drive configuration or both,
wherein the control arrangement (5) determines, on the basis of the ascertained torque load, an actual load collective for the drive train (3),
wherein the actual load collective is permanently stored in a data memory (10) of the control arrangement (5) at least in sections while the design-based load collective is being exceeded by the actual load collective, and
wherein, if the design-based load collective is exceeded by the actual load collective, the control arrangement (5) requires acknowledgement by the operator before permitting operation to continue.

18. A control arrangement for an agricultural working system comprising a self-propelled agricultural working machine (1a), the self-propelled agricultural working machine (1a) comprising:
at least one attachment (1b);
a drive unit (2) which acts via a drive train (3) on land wheels (4), and
a user interface and display unit (6);
wherein the control arrangement (5) ascertains the torque loads that occur during the working operation for at least one drive-train component (3a-k) of the land wheels (4) and provides at least one control function on the basis of the ascertained torque loads;
wherein a drive configuration associated with the working machine (1a) in the working operation influences the torque loads in the drive train (3) via the drive configuration;
wherein the associated breaking loads are stored in a data memory (10) of the control arrangement (5) for at least one drive-train component (3a-k),
wherein the control arrangement (5) compares the ascertained torque loads with the particular breaking loads and, on the basis of the comparison, determines an evaluation, optimization or both of the drive configuration in terms of the objective of a low likelihood of breakage, and
wherein the control arrangement (5) determines, on the basis of the ascertained torque loads, an evaluation, optimization or both, of the drive configuration, or, outputs an operator notification regarding the evaluation, optimization or both, in terms of at least one objective, performs the ascertained optimization of the drive configuration or both.

19. The control arrangement according to claim 18, wherein the control arrangement (5) determines, on the basis of the ascertained torque load, an actual load collective for the drive train (3),
wherein the actual load collective is permanently stored in a data memory (10) of the control arrangement (5) at least in sections while the design-based load collective is being exceeded by the actual load collective, and
wherein, if the design-based load collective is exceeded by the actual load collective, the control arrangement (5) requires acknowledgement by the operator before permitting operation to continue.

\* \* \* \* \*